April 15, 1930.  M. BORSODI  1,754,784

COMPOSITE FIBER BOARD

Filed July 16, 1927

INVENTOR
M. Borsodi
BY
ATTORNEY.

Patented Apr. 15, 1930

1,754,784

UNITED STATES PATENT OFFICE

MORRIS BORSODI, OF BROOKLYN, NEW YORK

COMPOSITE FIBER BOARD

Application filed July 16, 1927. Serial No. 206,308.

The present invention relates to improvements in composite fiber boards of the type which is especially adapted for use in building trades, although not limited to that use.

One of the objects of the invention is to provide a fiber board, which is exceedingly strong and rigid for its weight.

Another object of the invention is to provide a composite fiber board of the type mentioned, which possesses great heat insulating properties by reason of its having closed air spaces.

A further object of the invention is to provide a composite fiber board of a substantial thickness, consisting of spaced apart, preferably, cellular boards, the spacing means being in the form of strengthening ribs, imparting to the structure rigidity and greatly reducing its weight.

A still further object of the invention is to so design the composite board that its elements are adapted to be readily and quickly assembled, and are held in proper positions in relation to one another even if the board is roughly handled or subjected to considerable strains and stresses.

A still further object of the invention is to provide a novel method of assembling the elements of the composite board, forming the subject matter of the present application for Letters Patent.

With these and other objects in view, which will more fully appear as the nature of the invention is better understood, the same consists in the combination, arrangement and construction of parts hereinafter described, pointed out in the apppended claims and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
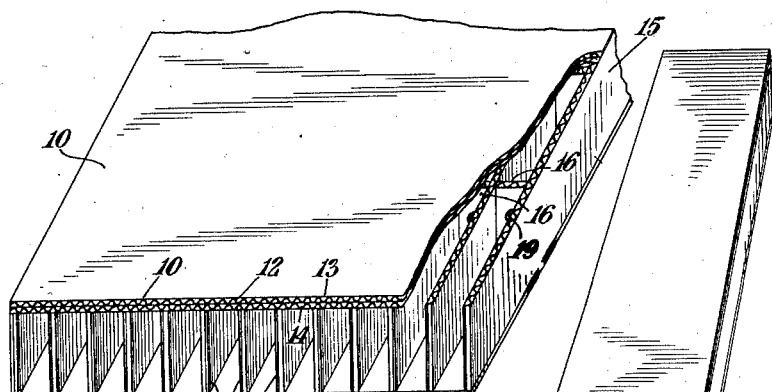
Figure 2:
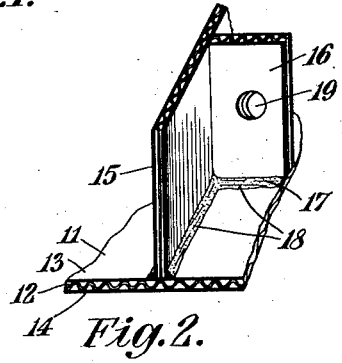
Figure 4:
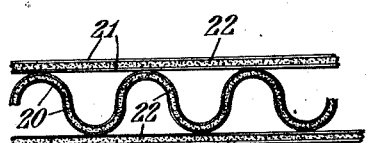
Figure 3:
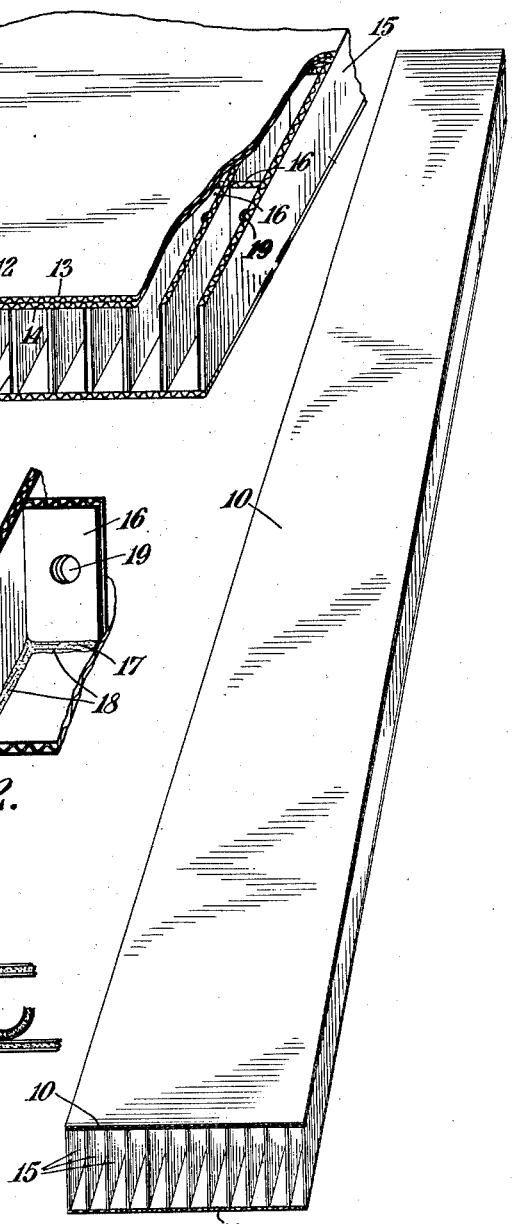

Figure 1 is a perspective view of a portion of a composite fiber board constructed in accordance with the present invention, some elements being broken away in order to more clearly show the interior construciton; Fig. 2 is a perspective view of a detail of construction, more particularly showing the joining of some of the elements of the board; Fig. 3 is a perspective view of a complete board; and Fig. 4 is a section taken through an element of the composite board, on a larger scale.

Referring now first to Figs. 1 to 3, inclusive, of the drawings, the composite structure consists of two parallel boards 10 and 11 of paper or like fibrous material, preferably, of the corrugated board type, although this is not essential. If of the corrugated type, each of these boards consists of a corrugated or indented core 12, provided with facings 13, and 14, which are united with the said core by a suitable adhesive or cement. The boards 10 and 11 may each consist of a single layer or of a plurality of layers, or one of the same may consist of one layer and the other one of more than one layer, as shown in Fig. 1 of the drawings. If consisting of more than one layer, the said layers are united by an adhesive. The boards 10 and 11 are spaced apart by a plurality of longitudinal, preferably, parallel ribs 15 and by transverse ribs 16. These ribs are also in the form of boards, preferably corrugated or cellular boards. The top board 10 and bottom board 11 are connected with the said ribs by a suitable adhesive or cementing material 17, which is caused, in assembling the elements of the board, to flow beyond the contacting surfaces of the ribs and the said top and bottom boards, forming, when dry, ridges 18, in which the ribs are embedded adjacent their top and bottom portions.

In the transverse ribs 16 are provided openings 19, for a purpose hereinafter to be described.

In assembling the composite board, the longitudinal ribs 15 and transverse ribs 16 are placed into a form in the desired relation to one another and locked in any suitable manner in such positions. The form is such that the major portions of the said ribs are disposed outside of the said form when locked in the latter. The form is then taken hold of and the exposed portions of the ribs dipped, in a tank, into a suitable adhesive or cementitious material and then the form with the ribs thereon placed onto one of the boards 10 or 11 with the form uppermost, so that the adhesive or cementing material is adapted to flow down the sides of the said ribs onto the inner surface of the board. In this manner the ridges 18 are formed. After the adhesive or cementitious material is sufficiently dry, the frame is removed from the ribs. It is obvious that the frame, owing to its weight, serves to press the ribs against the inner face of the board, to which they are to be attached. The ribs, which are now securely fastened to the board, are then again carried with the said board to the tank containing the adhesive or cementitious material, and those portions of the ribs dipped into the said material which were during the previous dipping operation held within the form. After the second dipping operation, the ribs, with one board secured thereto, are placed upon the other board forming part of the composite structure with the already fixed board uppermost, whereby the adhesive or cementitious material runs down the sides of the said ribs and forms ridges 18 on the second board of the structure. After these ridges are dry, the board is ready for use.

If necessary, the assembled board may be dipped, in its entirety, into a moisture- and fire-proof adhesive liquid substance. In such case, the openings 19 in some of the ribs of the assembled board permit of escape of air in the cells of the composite board.

The product herein described is adapted to be used in many of the arts and in some cases finds proper applications where other sheet materials of wood, metal, mineral substances, or their combinations, are now used in the building arts as wall, roofing, flooring or sheeting materials. The heights of the ribs may obviously be varied according to the requirements, that is to say according to the required thickness of the composite board, and it will be noted that, by reason of the air spaces between the elements of the composite board, a very light construction is obtained compared with solid boards. These air spaces also impart to the composite structure heat-insulating properties. The ribs above referred to extend both longitudinally and transversely of the structure, whereby a strong and rigid composite board is obtained, which does not yield perpendicularly to the boards 10 and 11 thereof.

Instead of making the boards and ribs of ordinary corrugated material, they may be produced in the manner shown in Fig. 4 of the drawings, from which it appears that the corrugated core is composed of two layers 20 and the facings are each composed of two layers 21. Between the layers of each element is disposed an adhesive moisture- and fire-proof or heat resisting material 22, which has the additional purpose of giving the construction considerable strength and rigidity.

What I claim is:—

The method of forming composite structures comprising two parallel spaced apart boards and spacing and reinforcing ribs interposed between said boards and united therewith by a cementitious material, which consists in, first, clamping the ribs in spaced relation in a form so as to permit the major portions of said ribs to extend beyond said form, second, dipping the exposed portions of said ribs into a cementitious material and placing the said ribs with the form uppermost onto one of said boards to permit the cementitious material to run down the faces of said ribs onto said board to form, when dried, ridges along the contact lines of said ribs and said board, third, drying the cementitious material, fourth, inverting the structure so obtained and dipping the free portions of said ribs into a cementitious material, fifth, placing the ribs with the first board thereon onto a second board and permitting the cementitious material to run down the faces of said ribs onto said second board to form, when dry, ridges along the contact lines of said ribs and said second board, and, sixth, permitting the cementitious material applied to said ribs during the second dipping operation to dry.

Signed at New York, in the county of New York, and State of New York, this 13th day of July, A. D. 1927.

MORRIS BORSODI.